United States Patent [19]

Dittrich et al.

[11] 3,956,983

[45] May 18, 1976

[54] IMPRINTING ARRANGEMENT FOR THE MARKING OF CYLINDRICAL SAMPLE RECEPTACLES FOR SPECIMEN IDENTIFICATION

[75] Inventors: Werner Dittrich; Werner Rauch, both of Nurnberg, Germany

[73] Assignee: Siemens Aktiengesellschaft, Erlangen, Germany

[22] Filed: Apr. 7, 1975

[21] Appl. No.: 565,606

[30] Foreign Application Priority Data

Apr. 20, 1974 Germany........................... 2419130

[52] U.S. Cl......................................... 101/6; 101/7; 101/8; 101/25; 101/31; 197/6.7

[51] Int. Cl.$^2$........................................... B44B 5/02

[58] Field of Search........................... 101/4, 6, 7–9, 101/23, 21, 25, 27, 31, 38 R, 38 A; 197/1.5, 1.6, 6.7; 234/37, 131; 83/194

[56] References Cited

UNITED STATES PATENTS

| | | | |
|---|---|---|---|
| 1,892,545 | 12/1932 | Ward | 101/7 |
| 2,453,681 | 11/1948 | Temple | 83/194 X |
| 2,716,378 | 8/1955 | George | 101/6 X |
| 2,902,924 | 9/1959 | Polleck et al. | 101/8 |
| 3,097,592 | 7/1963 | Friedman | 101/6 |
| 3,163,106 | 12/1964 | Failor | 101/6 |
| 3,215,244 | 11/1965 | Hickerson | 197/1.5 X |
| 3,269,510 | 8/1966 | Peters | 101/7 X |
| 3,283,701 | 11/1966 | Ritzerfeld | 197/1.5 X |
| 3,526,125 | 9/1970 | Gilford et al. | 234/131 X |
| 3,630,334 | 12/1971 | Connolly et al. | 197/6.7 |

FOREIGN PATENTS OR APPLICATIONS

| | | | |
|---|---|---|---|
| 2,216,846 | 10/1973 | Germany | 101/7 |

*Primary Examiner*—E. H. Eickholt
*Attorney, Agent, or Firm*—Haseltine, Lake & Waters

[57] ABSTRACT

An imprinting arrangement which allows for the application of an encoded and therewith associated clear-text information in an operative sequence, in which the imprinting of the clear-text information does not require more time than the punching in of the encoded information, and in which, finally, the clear-text information is applicable, in a smudgeproof and easily readable manner, to the upper portion of the receptacle. The arrangement includes a printing mechansim formed of a printing platen or roller, on whose cylindrical surface the imprinting dies are distributed so as to project radially outwardly, and which is fastened onto a rotatable shaft which is radially displaceable from a position of rest into an operative position in the direction of the rotational axis of the receptacle which is to be imprinted, wherein there is provided for the rotation of the printing platen for the selection of the particular imprinting die, a step motor for driving the shaft through the intermediary of a non-slippable elastic and in relation to the radial displacement symmetrical belt drive, wherein the radial displacement of the shaft is undertaken by imprinting magnets and whereby, additionally, the printing platen is encompassed by a heating device in its position of rest which will heat it to a temperature above the melting temperature of the receptacle material, and finally providing an inked ribbon arrangement by means of which the inked ribbon is conveyed between the printing platen and the rim of the receptacle, controlled by the imprinting magnets, so as to be displaced by the extent of the particular indicia width.

2 Claims, 3 Drawing Figures

IMPRINTING ARRANGEMENT FOR THE MARKING OF CYLINDRICAL SAMPLE RECEPTACLES FOR SPECIMEN IDENTIFICATION

FIELD OF THE INVENTION

The present invention relates to an imprinting arrangement for the marking of cylindrical sample receptacles for specimen or sample identification, which include a portion adapted to receive a specimen; a further portion for applying machine-readable (encoded) data for identifying the specimen, as well as a support portion which concurrently serves as the carrier of clear-text or plain language information associated with the encoded data; a holding arrangement for the support of the sample receptacles and their stepwise movement into holding positions of which one serves as a marking position, and in which there is located a marking arrangement. The marking arrangement consists of a rotatable receptacle-drive arrangement adapted to be coupled to the sample receptacle during the stationary phase of the holding arrangement with the sample receptacle located in the marking position for stepwise rotation of the latter about its longitudinal axis through constant remaining angular amounts conforming to the marking distances, and a punching device for application of the encoded data, as well as a printing mechanism for the imprinting of the clear-text information in the support portion which possesses a number of individually selectable stamping dies, of which the currently selected die is adapted to be pressed from a position of rest, by means of a printing magnet, against the rim of the holding arrangement of the receptacle during the stationary operating phase of the receptacle-drive arrangement; and which finally includes a control arrangement which controls the movements of the drive arrangement for the holding arrangement, the receptacle-drive arrangement, the punching device and the printing mechanism.

DISCUSSION OF THE PRIOR ART

An imprinting arrangement of the above-mentioned type is known from German Laid-Open Patent Specification 2,216,846. The arrangement serves to provide the sample or specimen receptacles which are received in a clinical-chemical laboratory with information in a simple manner and as rationally as possible, which will permanently and non-interchangeably identify the specimen. Hereby it has been found as being necessary that near a machine-readable (encoded) impression there may also be imprinted corresponding clear-text information, so that predetermined specimen may be identified during continuous laboratory operation without requiring the aid of a decoding arrangement, and thereby may be conveyed for selective and preferential treatment. Since the tubes forming the receptacles consist primarily of plastic material, this impressing of clear-text information inherently brings particular difficulties therewith. In principle, there are two known possibilities for the application of clear-text data, and namely, firstly, the impression of alphanumerical indicia into the plastic material with the aid of a heated die and, secondly, the impression through the use of color. Both methods are subject to disadvantages. In the impression with the aid of a heated die, the information can be recognized only with difficulty. In the imprinting of color, the danger of smudging is created since the plastic material which is utilized for the tubes possesses an extremely smooth surface. In connection with the afforded rapidity of the imprinting sequence, which is indispensable for rational operation, as well as a compact arrangement which the two marking sequences should be simultaneously carried out, there is created a technological problem, whose solution causes difficulties.

SUMMARY OF THE INVENTION

Accordingly, it is a primary object of the present invention to provide an imprinting arrangement which allows for the application of an encoded and therewith associated clear-text information in an operative sequence, in which the imprinting of the clear-text information does not require more time than the punching in of the encoded information, and in which, finally, the clear-text information is applicable, in a smudgeproof and easily readable manner, to the upper portion of the receptacle. Moreover, the arrangement must be extraordinarily reliable in operation and simple to manipulate.

The foregoing object is inventively achieved in that the printing mechanism is formed of a printing platen or roller, on whose cylindrical surface the imprinting dies are distributed so as to project radially outwardly, and which is fastened onto a rotatable shaft which is radially displaceable from a position of rest into an operative position in the direction of the rotational axis of the receptacle which is to be imprinted, wherein there is provided for the rotation of the printing platen for the selection of the particular imprinting die, a step motor for driving the shaft through the intermediary of a non-slippable, elastic and in relation to the radial displacement symmetrical belt drive, wherein the radial displacement of the shaft is undertaken by imprinting magnets and whereby, additionally, the printing platen is encompassed by a heating device in its position of rest which will heat it to a temperature above the melting temperature of the receptacle material, and finally providing an inked ribbon arrangement by means of which the inked ribbon is conveyed between the printing platen and the rim of the receptacle, controlled by the imprinting magnets, so as to be displaced by the extent of the particular indicia width.

In a further embodiment of the invention, the belt or pulley drive which drives the printing platen is formed as a toothed belt, and an imprinting arrangement is provided which is controlled by the imprinting magnets which, through the intermediary of two rollers at both sides of the belt between the drive pulleys in the position of rest of the printing platen, displaces the belt symmetrically to the direction of the radial displacement of the printing platen by such an amount transverse to the running direction, so that the tension of the belt remains constant independently of the radial displacement of the printing platen. Thereby is achieved that the imprinting die required for the currently subsequent printing sequence may be already selected in the position of rest of the printing platen, without the presence of the danger that through the radial displacement into the operative position a tangential displacement, there is effected any axial displacement of the die and that, additionally, through the utilization of a toothed belt, the position of the respective imprinting die may be always exactly predetermined, even over a lengthy period of operation.

BRIEF DESCRIPTION OF THE DRAWINGS

Reference may now be had to the following detailed description of an exemplary embodiment of the invention, taken in conjunction with the accompanying drawings; in which.

DETAILED DESCRIPTION

Figure 1:
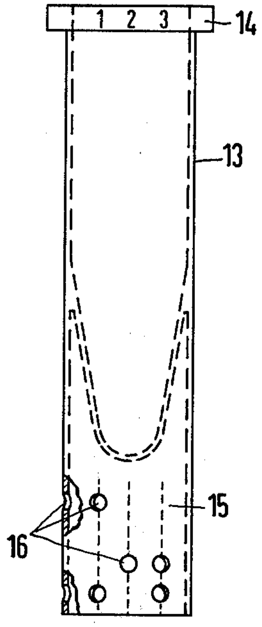
FIG. 1 illustrates a sample or specimen receptacle which has been marked in accordance with the invention.

Referring in detail to the drawings; a sample receptacle as shown in FIG. 1 in a side view, consists of internally funnel-shaped reducing cylindrical portion 13 which is adapted to receive the sample or specimen, a support portion in the form of a toroid or annular flange 14 for suspending the receptacle in a holding arrangement, as well as a portion 15 which is formed by an extension of the outer wall of the receptacle in an axial direction, and into which there may be punched the encoded information in the form of punched apertures 16 which are collected into code groups 1 through 12. On the peripheral or rim surface of the flange 14 there is located the clear-text information corresponding to code group 16, in the form of Arabic numerals 1 through 12, which facilitate the finding of a predetermined receptacle on the basis the so-called patient number so as to facilitate selective treatment or, in view of a particularly urgent case, a preferential treatment or handling.

Figure 2:
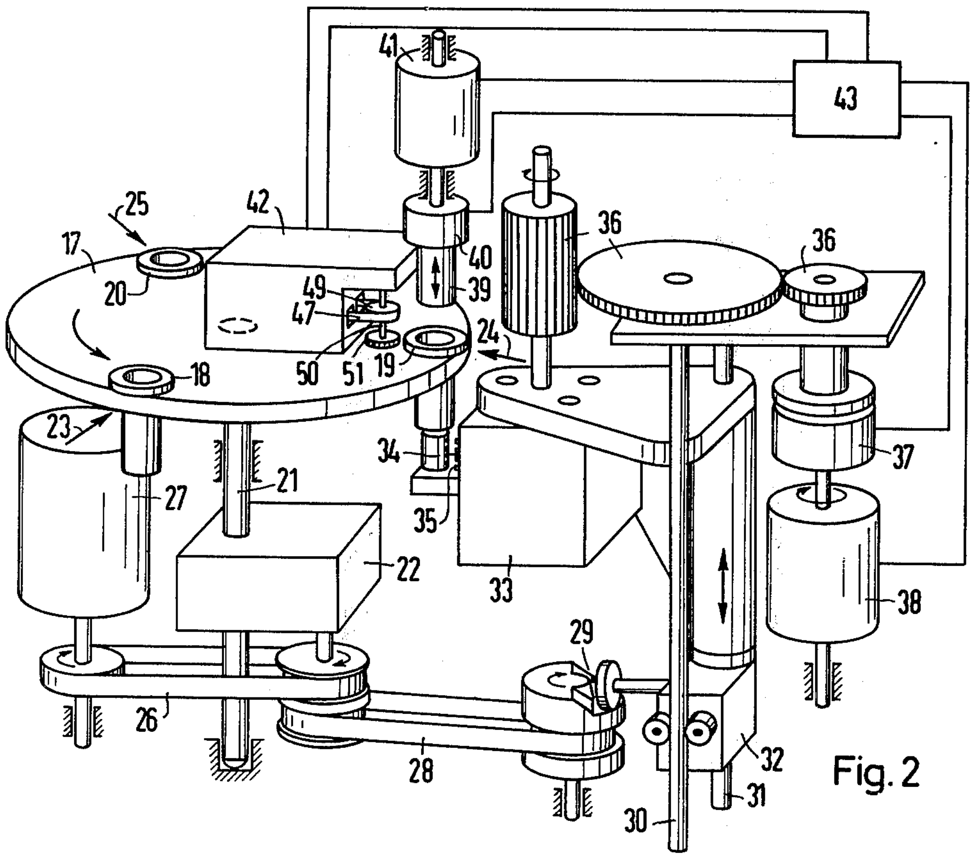
FIG. 2 perspectively illustrates a schematic arrangement for effecting the receptacle marking sequence.

In FIG. 2, an imprinting arrangement is schematically illustrated, in which a rotary plate or turntable 17 is provided as the holding arrangement, which possesses three apertures for each respectively receiving a sample tube or receptacle 18, 19 and 20. The turntable is fastened to a shaft 21 which is stepwise rotated in a counter-clockwise direction by a stepping mechanism 22 at angular displacements corresponding to the spacings of the holding positions 23, 24 and 25. The stepping mechanism 22 is driven by a main drive motor 27 through a toothed belt 26. By means of a further toothed belt 28, the motor 27 actuates a lift drive 29. This, in turn, moves a lift carriage 32 guided in columns 30, 31 in a vertical direction. Connected with the lift carriage 32 is a punch block 33 having a cutting cylinder 34 and punches 35. These punches are actuated by a punch motor 38 through the intermediary of a gear wheel drive 36 and a magnetic coupling 37. Above the turntable 17, located perpendicularly above the cutting cylinder, is a friction block 39 which is coupled with a receptacle-drive motor 41 through the intermediary of a lifting magnet 40. Thereby, located above the turntable 17 is an imprinting mechanism 42, described in greater detail in FIG. 3, for the imprinting of a clear-text corresponding to the code groups onto the outer rim surface of the flange 14 of the sample receptacles.

The function of this arrangement is as follows:

At first, by means of a control arrangement 43, the main drive motor 27 as well as the punching motor 38 are set into operation. The main drive motor 27, on the one hand, drives the stepping mechanism 22 and, on the other hand, the lift drive 29. Thereby, the rotary plate or turntable 17 is then set into movement. In the infeed position 23, in the marking position 24 and in the ejection position 25, are shown the sample receptacles 18, 19 and 20. It is assumed that they have just been moved into these positions. The lift drive 29 now moves the lift carriage 23 upwardly by such a distance so that the cutting cylinder 34 extends into the information area 15 of the receptacle 19. After the cutting cylinder has reached this position, the control arrangement 39 actuates the magnetic coupling 37 so that the stamping die corresponding to the desired encoded information is conveyed out of the punching block and punches an aperture group into the peripheral surface of the tube. The manner in which the punching block receives the necessary information has no bearing on an understanding of the invention and, consequently, is not described in detail. COncurrently, the control arrangement 43 actuates the printing mechanism 42 in a manner to be described hereinbelow, so that clear-text information corresponding to one of the particular code groups is imprinted on the peripheral surface of the receptacle. After the completion of this sequence, the control arrangement 43 actuates the lifting magnet 40 which presses the friction block 39 downwardly until the latter lies against the inner rim of the receptacle 19. The control arrangement 43 then transmits an impulse to the step motor 41 so that the latter carries out a rotational movement, which is imparted to the receptacle 19, by an angular displacement corresponding to the spacings of the code groups 1 through 12. Then, the control arrangement 43 switches in the magnetic coupling 37, so that the subsequent code information and associated clear-text information are impressed on the receptacle 19. Thereafter, the previously described sequence of imprinting repeats itself, and the further rotation of the receptacle by angular displacements corresponding to the spacing between the code groups for so long until the final information is punched in. The speed of the main drive motor 27 thereby is so selected that the total punching sequence is completed before the renewed movement of the turntable 17. Before the turntable 17 moves, the previously coded receptacle is also removed from the ejecting position 25. During this time, the lift drive 29 has lowered the lift carriage 23 of the punching block 33 by such an amount, so that the cutting cylinder 34 finds itself again in the illustrated position below the receptacle 19. The stepping mechanism 22 now moves the turntable 17 through a rotational angle corresponding to the spacings of the hold positions 23, 24 and 25, so that the receptacle 18 is now located in the marking position. Subsequently, a new receptacle is supplied to the turntable 17 at the infeed position 23. The sequence is then repeated in the above-described manner.

Figure 3:
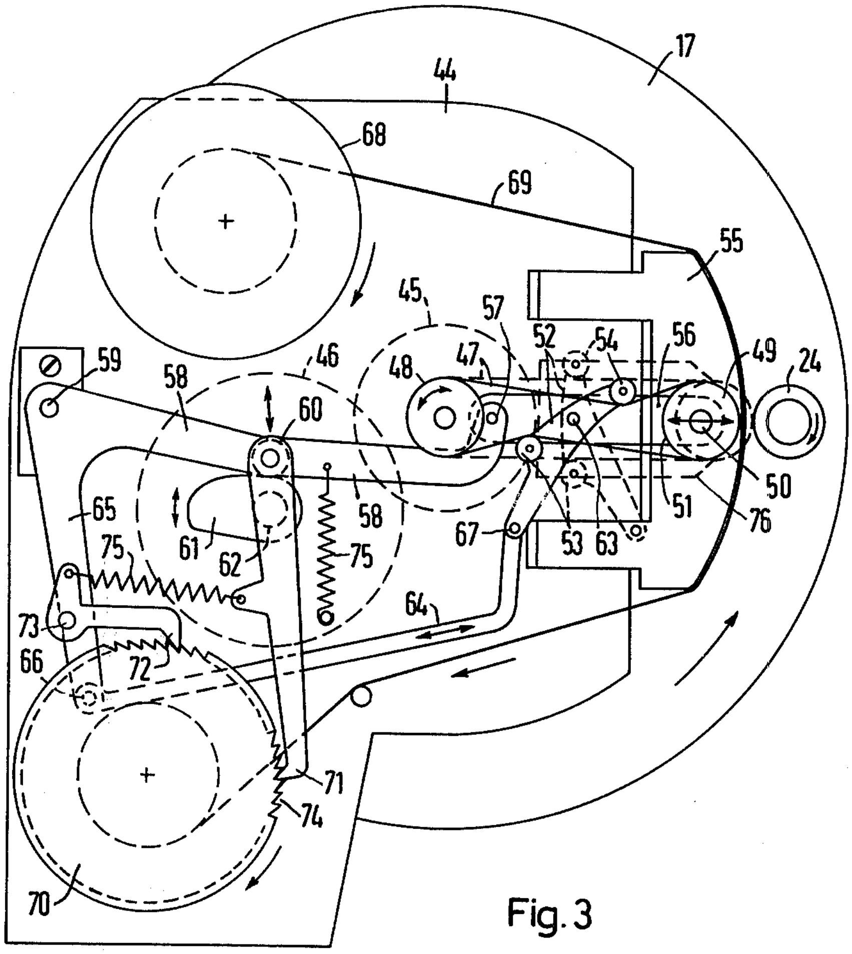
FIG. 3 illustrates the major constructional elements of a printing mechanism for the imprinting of the clear-text information on the receptacle.

In FIG. 3 of the drawings, the basic construction of the printing mechanism 42 is described in greater detail. Above the turntable 17 there is located a support plate 44, on which there is fastened a stepping motor 45 and a rotary magnet 46. The stepping motor 45 is connected to the printing platen or roller 51, the latter of which is driven through a shaft 50 by means of a pulley drive having a toothed belt 47 and two pulleys of which pulley 48 has a stepping motor 45 associated therewith, and pulley 49. Between the two pulleys 48, 49, on the outer sides of the toothed belt 47, two presser rollers 53 and 54 are located on a presser lever 52. The shaft 50 of the printing platen or roller 51 is connected with a sliding carriage 55 which is so conveyed in recesses formed in the support plate 44, that the printing roller 51 allows itself to be moved radially towards the point of rotation of the receptacle 24. This sliding carriage 55 is supported on a pivot 59 fastened to the support plate 44, through a plunger rod 56 which is similarly conveyed in the recesses in the support plate 44 in the direction of movement of the carriage 55, and connected through a pressure bearing 57 with an elbow lever 58. The two portions of the elbow lever 58 are approximately equally long and connected approximately midway with each other through a cam roller 60 between the pressure bearing 57 and the pivot 59. The cam roller 60 lies against the cam 61, which is connected with the impressing magnet 46 by means of a shaft 62. The presser lever 52 which is pivotally supported between the pressure rollers 53, 54 on a shaft 63 which is fastened on the support plate 44 at the sectional point of the connection between the axes of the stepping motor 45 and the presser roller 51, has connection to the elbow lever 58 through a rod 64 and a lever 65. The lever 65 is rigidly connected with the elbow lever 58 at the pivot 59, and is pivotably connected with the rod 64 through a swivel 66. The swivel is connected with the presser rod 52 through a further swivel 67. For the improved readability of the imprinted clear-text there is provided an inked ribbon arrangement which consists of a supply roller 68, an inked ribbon 69, a wind-up roller 70, as well as a locking or ratchet drive which is formed of an escapement arm 71 which is linkably connected with the cam roller 60, and a ratchet 72, which is connected through a pivot 73 with the support plate 44. Slits 74 are introduced in the wind-up roll 70, in which engage the escapement arm 71 and the ratchet 72 engage. The inked ribbon 69 is conveyed between the receptacle 24 and the printing platen or roller 51 across the end surface of the carriage 55 which faces towards the receptacle 24.

The operative function of the printing mechanism is as follows:

After the control arrangement 43 has actuated the punching arrangement with the motors 38 and 41, the stepping motor 45 is then actuated, which receives the same information in clear-text as the punching block 33 receives in coded form and thereby, through rotation of the belt pulley 48 about a corresponding angular displacement and transmission of this rotation through the pulley drive 47, 48, 49, selects that particular die of the printing platen or roller, and brings it into a position located opposite to the receptacle 24, which corresponds to the supplied information. Hereby, the presser lever 52 finds itself in the illustrated extended position. Thereafter, the control arrangement 53 actuates the imprinting magnet 46 which, proceeding from the illustrated position, carries out a clockwise directed rotational movement through an angle of 90°. Hereby, the cam roller 60 is moved upwardly. This movement is transmitted once, through the presser bearing 57 and the plunger rod 56, to the shaft 50 of the printing platen, so that the latter moves in the direction towards the receptacle 24. Secondly, this movement is conveyed through the lever 65 and the connection rod 64 to the presser lever 52, which in a pivoting movement about the pivot 63 acting as the rotational axis is moved counter-clockwise into the phantom illustrated position. Thirdly, the escapement arm 71, which is connected through a spring 75 with the ratchet 72 so that both are pressed against the slits 74, is upwardly displaced and locks into the subsequent slit in the wind-up roller 70. Thereby, the ratchet 27 prevents any digressive movement of the wind-up roller 70. After the completion of the printing sequence, the control arrangement 43 interrupts the current circuit of the imprinting magnet 46 so that this, together with its cam 61, is moved back into the illustrated position. Thereby, the elbow lever 58 similarly is moved back into the illustrated position by a spring 75, and thereby also the printing platen or roller 51 and the presser lever 53, which with the aid of presser rollers 53, 54 pushes the toothed belt inwardly by such an amount, that a predetermined tension remains present notwithstanding the actual displacement of the printing roller into the illustrated extended position. This is extremely important for a precise presetting of the imprinting die for the subsequent printing sequence. Furthermore, the escapement arm 71 is also again reconveyed into the illustrated initial position, so that the wind-up roller 70 of the inked ribbon rotates through such an angular displacement so that the inked ribbon is transported further by the width of a marking or indicia in the direction of the arrow. During the entire printing sequence, a heating cartridge located in the chamber 76, and thereby the printing roller, is heated to a predetermined value which is dependent upon the material of the tube.

While there has been shown what is considered to be the preferred embodiment of the invention, it will be obvious that modifications may be made which come within the scope of the disclosure of the specification.

What is claimed is:

1. In an imprinting arrangement for the marking of cylindrical sample receptacles for specimen identification, said receptacles each having a specimen receiving portion, a portion of machine-readable encoded data for identifying the specimen, and a support portion serving as carrier of clear-text information correlated with said coded data; including holding means for supporting said sample receptacles and effecting their stepwise movement into a plurality of hold positions, one said position being a marking position; a marking arrangement associated with said marking position, said marking arrangement including receptacle-drive means adapted to be coupled with said sample receptacle located in the marking position thereof during the stationary operative phase of said holding means and being stepwise rotatable about its longitudinal axis through equal-remaining angular displacements conforming to the marking spacings on said receptacle, a punch arrangement for the application of said coded data on said receptacles; and printing means for imprinting the clear-text information on the support portion of said receptacle, said printing means including a plurality of singly selectable imprint dies, a printing magnet adapted to pass said currently selected imprint die during the stationary operative phase of the receptacle-drive means from a position of rest against the rim of the support portion of said receptacle; and control means for controlling the movements of the drive means for said holding means, receptacle-drive means, punch arrangement and printing means, the improvement comprising: said printing means comprising a printing roller, said imprint dies being distributed about the peripheral surface thereof and projecting radially outwardly, a rotatable shaft mounting said printing roller, said shaft being radially displaceable from a position of rest into an operative position directed towards the rotational axis of the receptacle being imprinted; a stepping motor; a non-slippable, elastic and radial displacement-symmetrical belt drive interconnecting said motor and said shaft for rotating said printing roller and selecting the respective imprint die; printing magnet means for imparting radial displacement to said shaft; heating means encompassing said printing roller in the position of rest of the latter for raising the temperature of said printing roller above the melting temperature of the receptacle material; and inked ribbon means controlled by said printing magnet means for conveying an inked ribbon between said printing roller and the rim of said receptacle for a distance conforming to the respective indicia width.

2. An imprinting arrangement as claimed in claim 1, said belt drive for driving said printing roller comprising toothed belts; imprint means controlled by said printing magnet means for displacing said belts transversely to the running direction symmetrically to the direction of radial displacement of said printing roller, said displacement being effected through rollers on both sides of the belt between belt drive pulleys in the position of rest of the printing roller, said displacement being of an extent whereby the tension of the belt remains constant independently of the radial displacement of said printing roller.

* * * * *